United States Patent [19]

Freyberger et al.

[11] Patent Number: 4,494,137
[45] Date of Patent: Jan. 15, 1985

[54] INTEGRATED INTERFACE CIRCUIT BETWEEN THE RGB MATRIX AND THE VIDEO OUTPUT STAGES OF COLOR-TELEVISION SETS

[75] Inventors: Laurin C. Freyberger, Bahlingen; Bernd Novotny, Gundelfingen, both of Fed. Rep. of Germany

[73] Assignee: ITT Industries, Inc., New York, N.Y.

[21] Appl. No.: 388,824

[22] Filed: Jun. 16, 1982

[30] Foreign Application Priority Data

Jul. 8, 1981 [EP] European Pat. Off. .......... 81105292

[51] Int. Cl.³ ...................... H04N 9/12; H04N 9/535
[52] U.S. Cl. ...................................... 358/27; 358/168; 358/33; 358/40
[58] Field of Search ............... 358/21 R, 27, 33, 39, 358/64, 40, 65, 160, 168, 170

[56] References Cited

U.S. PATENT DOCUMENTS

| | | | |
|---|---|---|---|
| 3,701,843 | 10/1972 | Hepner | 358/5.4 D |
| 4,167,751 | 9/1979 | Wilcox | 358/30 |
| 4,270,139 | 5/1981 | Flamm | 358/23 |
| 4,347,528 | 8/1982 | Johnson | 358/65 |

FOREIGN PATENT DOCUMENTS 2947212 5/1981 Fed. Rep. of Germany .

OTHER PUBLICATIONS

Vollständiger Pal-Decoder Mit Der Integrierten Schaltung TDA 3560 Dec. 1979, Valvo-Entwicklungsmitteilungen.

*Primary Examiner*—Michael A. Masinick
*Attorney, Agent, or Firm*—Donald J. Lenkszus

[57] ABSTRACT

The interface circuit contains a single operational amplifier (OR, OG, OB) per chrominance channel, with a resistance network (WR, WG, WB) for white-level adjustment connected between the inverting input and the output of this amplifier. The output resistances of the matrix output amplifiers (MR, MG, MB) must be low, and a low-value resistor (RR, RG, RB) is connected between the output of each output amplifier and the noninverting input of each operational amplifier (OR, OG, OB). Video-signal, brightness-, blanking-, and external-signal-control currents (ISR, ISG, ISB; IHR, IHG, IHB; IBR, IBG, IBB; IER, IEG, IEB) are applied to the non-inverting input of the respective operational amplifier.

The control currents permit the white-level adjustment and the blanking-voltage adjustment to be made independently of each other and eliminate any interaction between brightness adjustment, blanking, and external-signal gating. Compared with prior art arrangements, a simpler circuit is obtained.

20 Claims, 1 Drawing Figure

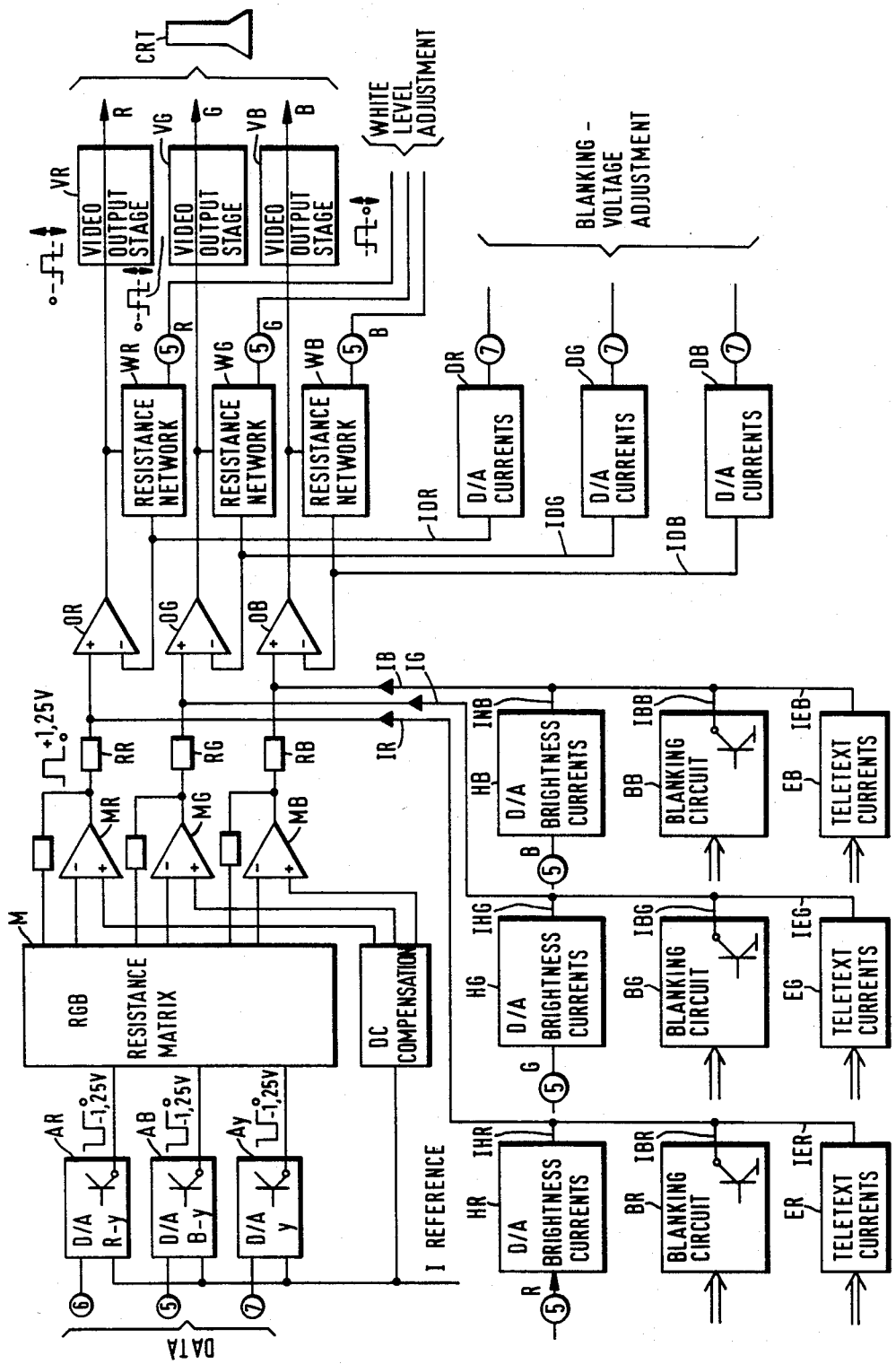

INTEGRATED INTERFACE CIRCUIT BETWEEN THE RGB MATRIX AND THE VIDEO OUTPUT STAGES OF COLOR-TELEVISION SETS

BACKGROUND OF THE INVENTION

The present invention relates to an integrated interface circuit comprising an operational amplifier between the output of each output amplifier of the RGB matrix and the input of each video output stage driving the picture tube of a color-television set, and subcircuits for brightness adjustment, blanking, external-signal gating, white-level adjustment, and blanking-voltage adjustment, as set forth in the preamble of claim 1. Such interface circuits are disclosed, for example, in the printed publication "Valvo-Entwicklungsmitteilungen", No. 77, December 1979 ("Vollst/ändiger PAL-Decoder mit der integrierten Schaltung TDA 3560"), particularly on pages 8 to 12 and 18 to 20.

In the prior art arrangement, the external signal is gated via a capacitor, so that the DC level of the gated signals must be recovered by clamping it to the black level of the signals provided by the RGB matrix, see FIG. 9 and text on page 11. As shown in FIG. 10 on page 12, the brightness adjustment is performed in the prior art arrangement by means of a potentiometer as usual, but this potentiometer drives a special operational amplifier whose gated output acts on the input of the operational amplifier between the output of the RGB matrix and the input of the output stage. The latter operational amplifier has a stable gain, and its output drives the video output stages via a limiter stage followed by an output stage. As shown in FIG. 15 on page 19, the blanking-voltage and white-level adjustments are effected at the input of the video output stages by means of two trimmer potentiometers one of which is connected in parallel with the base-emitter circuit of the low-end transistor, while the other is inserted between the output of the aforementioned output stage and the input of this transistor.

It is obvious that in such an arrangement, the blanking-voltage adjustment and the white-level adjustment influence each other so that the manufacturer can make the adjustment only iteratively by adjusting the two trimmer potentiometers in turn. In addition, the external-signal gating and the brightness adjustments in the prior art arrangement require an amount of circuitry which may be cumbersome in large-scale integrated circuits.

The invention as characterized in the claims is intended to remedy this drawback; it therefore solves the problem of how to simplify an interface circuit of the above kind in such a way that the requirements placed on the operation of this circuit are met with a smaller amount of circuitry; in addition, blanking-voltage adjustment and white-level adjustment, in particular, are to be possible without interaction.

SUMMARY OF THE INVENTION

The essential advantage of the invention follows directly from the solution to the problem; another advantage lies in the fact that, since the drive chosen is exclusively by means of currents, the arrangement is readily suitable for use in color-television sets employing digital signal processing, such as in sets as disclosed in Offenlegungsschrift DE 28 54 236 A1.

Other objects, features and advantages of the present invention will become more fully apparent from the following detailed description of the preferred embodiment, the appended claims and the accompanying drawing in which:

BRIEF DESCRIPTION OF THE DRAWING

The invention will now be explained in more detail with reference to the accompanying drawing which shows the circuit of an embodiment of the invention in a block diagram.

DETAILED DESCRIPTION OF THE INVENTION

In the drawing, the RGB matrix M has one output amplifier for each chrominance channel, i.e., the three output amplifiers MR, MG, MB, where R, G, and B specify the chromaticity being processed, i.e., "red", "green", and "blue", respectively; the same applies to the other subcircuits described below. According to the invention, the output amplifiers MR, MG, MB are chosen to have a low output resistance, which can be achieved, for example, by providing them with emitter-follower or source-follower output stages.

The output of each of the output amplifiers MR, MG, MB, is connected via a low-value resistor RR, RG, RB to the non-inverting input of an operational amplifier OR, OG, OB, whose output is connected directly to the input of a video output stage VR, VG, VB having its output coupled to the cathode of the color-picture tube CRT. For white level adjustment, a preferably digitally adjustable resistance network WR, WG, WB providing negative feedback is connected between the output and the inverting input of each of the operational amplifiers OR, OG, OB. The inverting inputs of the operational amplifiers OR, OG, OB are also fed with blanking-voltage control currents IDR, IDG, IDB. In the figure of the drawing, these control currents are provided by digital-to-analog-current converters DR, DG, DB, which convert digital signals into the control currents.

These digital signals are derived, for example, by continuously measuring the beam current of the color-picture tube CRT, but this is not the subject matter of the invention.

With this arrangement, the white-level adjustment and the blanking-voltage adjustment can be made independently of each other, because they do not interact.

For brightness adjustment, brightness control currents IHR, IHG, INB are applied to the noninverting inputs of the operational amplifiers OR, OG, OB, i.e., to the junctions of the low-value resistors RR, RG, RB and the respective non-inverting inputs.

Similarly, external-signal currents IER, IEG, IEB are supplied to the non-inverting inputs of the operational amplifiers OR, OG, OB. Thus, in addition to the video-signal currents IS, the total currents IR, IG, IB flow through the respective low-value resistor RR, RG, RB and the low-value output resistor of the respective matrix output amplifier MR, MG, MB. For blanking, this current sum of the respective R-, G-, and B-channel is taken by the blanking circuit BR, BG, BB during the blanking interval, so that the operational amplifiers OR, OG, OB receive no input signal and provide the blanking voltage set by the blanking-voltage adjustment. Due to the linear superposition of the individual currents by means of the resistors mentioned above, the individual currents do not influence each other, so that no special steps need be taken to "isolate" the brightness-adjustment, blanking, and external-signal gating functions from each other.

In the embodiment of the figure of the drawing, brightness adjustment is again performed with digital-to-analog-current converters HR, HG, HB, which convert digital signals into control currents IHR, IHG, INB; see the above-mentioned Offenlegungsschrift DE 28 54 236 A1. In the blanking circuits BR, BG, BB, a signal commonly available as a blanking voltage is used to switch transistor switches which take the blanking currents IBR, IBG, IBB. In converter stages ER, EG, EB, an external signal must be converted into corresponding external signal currents IER, IEG, IEB. Such external signals may be viewdata-system signals or signals from comparable systems. It is also possible, however, to apply other gating signals at this point, such as channel-number display or picture-in-a-picture signals.

In the embodiment of the FIGURE, the RGB matrix M is controlled by digital-to-analog converters AB, AR, AY, which convert digital B-Y, R-Y, and Y signals into corresponding analog signals. These digital signals also occur during digital signal processing; see the above-mentioned DE 28 54 236 A1. They are the digital Blue-minus-Luminance color-difference signal (B-Y), the digital Red-minus-Luminance color-difference signal (R-Y), and the digital luminance signal (Y).

If conventional analog signal processing is used in the color-television receiver rather than digital signal processing, the RGB matrix M must be controlled with the usual analog signals, and the control current must be derived, in the known manner, from the respective analog signals by means of voltage-to-current converter stages. The invention is thus applicable both to color-television receivers using digital signal processing and to receivers using analog signal processing.

During digital signal processing, the individual subcircuits of the integrated circuits are commonly implemented with insulated-gate field-effect transistors, i.e., in MOS technology. The invention can preferably be implemented in 3D bipolar technology, i.e., in triple diffused technology, particularly if analog signal processing is used in the television receiver.

While the present invention has been disclosed in connection with the preferred embodiment thereof, it should be understood that there may be other embodiments which fall within the spirit and scope of the invention as defined by the following claims.

We claim:

1. In a color television or the like, the combination comprising:
    an RGB matrix having a plurality of output amplifiers, each of said output amplifiers being associated with one of the plurality of chrominance channels and providing a video signal circuit at its output; each having a low output impedance;
    a plurality of video output stages for driving a picture tube or the like;
    a plurality of interface circuits, each of said interface circuits coupling the output of one of said plurality of output amplifiers to an input of a corresponding one of said plurality of video output stages, each of said plurality of interface circuits comprising:
    an operational amplifier having first and second complementary inputs and an output, said output being coupled to said input of said corresponding one of said plurality of video output stages;
    a low-value resistor coupled between the output of said one of said plurality of output amplifiers and said first input;
    an adjustable resistance network coupled between said second input and said operational amplifier output for white level adjustment;
    blanking voltage adjustment means for supplying a blanking voltage control current to said second input;
    brightness means for coupling a brightness control current to said first input; and
    blanking means for coupling a blanking control current to said first input.

2. The combination in accordance with claim 1 further comprising: gating means for coupling a gating control current to said first input.

3. The combination in accordance with claim 1 wherein: said blanking voltage adjustment means comprises a first digital to analog current converter responsive to digital blanking voltage adjustment signals for generating said blanking voltage control current.

4. The combination in accordance with claim 1 wherein: said brightness means comprises a second digital to analog converter for generating said brightness control current in response to brightness control signals.

5. The combination in accordance with claim 2 wherein: said gating means comprises an analog voltage to current converter responsive to analog signals for generating said gating control current.

6. The combination in accordance with claim 2 wherein: said blanking voltage adjustment means comprises a first digital to analog current converter responsive to digital blanking voltage adjustment signals for generating said blanking voltage control current.

7. The combination in accordance with claim 2 wherein: said brightness means comprises a second digital to analog converter for generating said brightness control current in response to brightness control signals.

8. The combination in accordance with claim 6 wherein: said gating means comprises an analog voltage to current converter responsive to analog signals for generating said gating control current.

9. The combination in accordance with claim 7 wherein: said gating means comprises an analog voltage to current converter responsive to analog signals for generating said gating control current.

10. A combination in accordance with claim 1 wherein: said adjustable resistance network is adjustable in response to a digital control signal.

11. A combination in accordance with claim 2 wherein: said adjustable resistance network is adjustable in response to a digital control signal.

12. A combination in accordance with claim 3 wherein: said adjustable resistance network is adjustable in response to a digital control signal.

13. A combination in accordance with claim 4 wherein: said adjustable resistance network is adjustable in response to a digital control signal.

14. A combination in accordance with claim 5 wherein: said adjustable resistance network is adjustable in response to a digital control signal.

15. A combination in accordance with claim 1 wherein:
    said RGB matrix has first, second and third inputs; and comprising:

a third digital to analog converter having an analog output coupled to said RGB matrix first input and controlled with a digital R-Y signal;

a fourth digital to analog converter having an analog output coupled to said RGB matrix second input and controlled with a B-Y signal; and a fifth digital to analog converter having an analog output coupled to said RGB matrix third input and controlled with a Y signal.

16. A combination in accordance with claim 2 wherein:

said RGB matrix has first, second and third inputs; and comprising:

a third digital to analog converter having an analog output coupled to said RGB matrix first input and controlled with a digital R-Y signal;

a fourth digital to analog converter having an analog output coupled to said RGB matrix second input and controlled with a B-Y signal; and a fifth digital to analog converter having an analog output coupled to said RGB matrix third input and controlled with a Y signal.

17. A combination in accordance with claim 3 wherein:

said RGB matrix has first, second and third inputs; and comprising:

a third digital to analog converter having an analog output coupled to said RGB matrix first input and controlled with a digital R-Y signal;

a fourth digital to analog converter having an analog output coupled to said RGB matrix second input and controlled with a B-Y signal; and a fifth digital to analog converter having an analog output coupled to said RGB matrix third input and controlled with a Y signal.

18. A combination in accordance with claim 4 wherein:

said RGB matrix has first, second and third inputs; and comprising:

a third digital to analog converter having an analog output coupled to said RGB matrix first input and controlled with a digital R-Y signal;

a fourth digital to analog converter having an analog output coupled to said RGB matrix second input and controlled with a B-Y signal; and a fifth digital to analog converter having an analog output coupled to said RGB matrix third input and controlled with a Y signal.

19. A combination in accordance with claim 5 wherein:

said RGB matrix has first, second and third inputs; and comprising:

a third digital to analog converter having an analog output coupled to said RGB matrix first input and controlled with a digital R-Y signal;

a fourth digital to analog converter having an analog output coupled to said RGB matrix second input and controlled with a B-Y signal; and a fifth digital to analog converter having an analog output coupled to said RGB matrix third input and controlled with a Y signal.

20. A combination in accordance with claim 10 wherein:

said RGB matrix has first, second and third inputs; and comprising:

a third digital to analog converter having an analog output coupled to said RGB matrix first input and controlled with a digital R-Y signal;

a fourth digital to analog converter having an analog output coupled to said RGB matrix second input and controlled with a B-Y signal; and a fifth digital to analog converter having an analog output coupled to said RGB matrix third input and controlled with a Y signal.

* * * * *